United States Patent [19]

Lienert et al.

[11] 4,160,851

[45] Jul. 10, 1979

[54] PROCESS FOR THE PRODUCTION OF PLASTICS/METAL COMPOSITES

[75] Inventors: Hans-Jurgen Lienert, Cologne; Helmut Kleimann, Leverkusen; Dieter Dieterich, Leverkusen; Wulf von Bonin, Leverkusen; Klaus Friederich, Leverkusen, all of Fed. Rep. of Germany; Peter Markusch, New Martinsville, W. Va.

[73] Assignee: Bayer Aktiengesellschaft, Leverkusen, Fed. Rep. of Germany

[21] Appl. No.: 817,880

[22] Filed: Jul. 21, 1977

[30] Foreign Application Priority Data

Jul. 28, 1976 [DE] Fed. Rep. of Germany ....... 2633764

[51] Int. Cl.² .................... B05D 1/38; B05D 7/14; B05D 3/02
[52] U.S. Cl. .................................. 427/379; 427/302; 427/333; 427/340; 427/409
[58] Field of Search ............... 427/302, 333, 340, 379, 427/409; 428/424

[56] References Cited

U.S. PATENT DOCUMENTS

| | | | |
|---|---|---|---|
| 2,850,424 | 9/1958 | Finelli et al. | 428/424 X |
| 3,309,261 | 3/1967 | Schiller et al. | 428/424 |
| 3,589,932 | 6/1971 | Wittcoff et al. | 427/409 X |
| 4,004,050 | 1/1977 | Rabito et al. | 428/424 X |

*Primary Examiner*—James R. Hoffman
*Attorney, Agent, or Firm*—Gene Harsh; Joseph C. Gil; R. Brent Olsen

[57] ABSTRACT

This invention relates to the production of composites of organic polyisocyanate plastics and metals. The metals are pretreated with certain adhesion promoters in order to increase adhesion between the metal and the plastic. The pretreated metal sheet or foil is brought into contact with the reaction mixture during the chemical reaction while the plastic is being formed.

14 Claims, No Drawings

PROCESS FOR THE PRODUCTION OF PLASTICS/METAL COMPOSITES

BACKGROUND OF THE INVENTION

Composite materials of plastics, especially rigid, semi-rigid, and flexible polyisocyanate foams in conjunction with metals and eminently suitable for the mass production of lightweight furniture, sporting goods, venicle bodies, construction, heat-insulated containers, or tubes industries. They may be produced, for example, by introducing the metal component into a mold and subsequently pouring the foamable reaction mixture into the mold, where it foams and hardens, preferably in an extremely dense form. This heavy densification, which is generally accompanied by the development of a cellular core and a solid outer layer, is obtained by measuring the quantity of reaction mixture introduced into the mold in such a way that, the foam would occupy a greater volume than the volume of the mold. The result of this is that the foam completely fills the mold and exactly reproduces the inner surfaces thereof. At the same time, the sheet of metal introduced is bonded to the foam.

Another method of producing composite materials of the type in question is to coat metal surfaces with a reaction mixture which reacts to form the plastic, preferably a foamed plastic. The strength of the bond between metal and plastic which is obtained in this way is inadequate for numerous technical applications.

In general, composite materials of metals and foams, especially polyurethane foams, are subjected to heavy mechanical stressing. These materials are only able to withstand this stressing if a permanent, shear-proof bond has been established between metal and plastic. In addition, the reinforcing effect of metals coated with polyurethane foams is only attained if the strength of the bond between polyurethane and metal is adequate. For this reason, several techniques have been developed with a view to improving the adhesion of polyurethanes to metals. For example, the metals have been sandblasted before foaming (Piechota/Rohr: Integralschaumstoffe, Hansa Verlag, Munich/Vienna 1975) in order to obtain additional anchorage of the foam to the metal by roughening the surface. A variety of different adhesives have also been used (Piechota/Rohr: Integralschaumstoffe, Hansa Verlag, Munich/Vienna 1975) and, in some cases, have produced a certain improvement in the strength of the bond between the two materials. However, it has been found in practice that all these bonds gradually deteriorate and, in some cases, are completely destroyed by the effects of hydrolysis.

Bonds of high strength may be obtained, for example, by treating the metals before foaming with certain alkoxy silanes (Dow Corning, Pamphlet 03-023.03, July 1969; E. P. Plueddemann, Journal of Paint Technol., Nov. 1970). Unfortunately, the bond obtained by this method is not sufficiently resistant to boiling.

DESCRIPTION OF THE INVENTION

It has now surprisingly been found that, by pretreating the metals with aqueous polyurethane dispersions, it is possible to obtain a considerable improvement in the adhesion of the foam to the surface of the metal. A very considerable improvement is obtained by a combination of alkoxy silanes with aqueous polyurethane dispersions as adhesion promoters. In cases where these two adhesion promoters are used, it is possible at the same time to obtain an extremely strong, hydrolysis-stable bond.

Accordingly, the present invention relates to a process for the production of composite materials of polyisocyanate plastics and metals, the plastics being produced by conducting a reaction mixture which forms a polyisocyanate plastic in such a way that the reaction mixture comes into contact with the surface of the metal during the chemical reaction. To improve the adhesion of the plastics to the metals, the metals are first coated on the side to which the plastics are to be applied with an aqueous polyurethane dispersion and the chemical reaction by which the plastic material is formed is carried out after drying of the coating obtained in this way.

More particularly, the present invention relates to an embodiment of this processss which is distinguished by the fact that the metals are coated with an aqueous polyurethane dispersion which additionally contains alkoxy silanes.

The force, in Newtons, required to separate a 0.3 mm thick and 20 mm wide strip of metal from a 300 mm long polyurethane foam may be regarded as a measure of the adhesion forces.

The resistance to hydrolysis of the bond between metal and polyurethane may be measured by boiling a composite material, consisting of a prefoamed metal strip and polyurethane (dimensions of the composite material: $300 \times 20 \times 10$ mm, dimensions of the prefoamed metal strip: $300 \times 20 \times 0.3$ mm), in water for 3 hours at a temperature of 100° C. and then measuring the maximum force required to detach the metal strip after cooling of the composite material.

In the context of the present invention, polyisocyanate plastics are solid, i.e. non-foamed plastics and, preferably, foams, which may be obtained from polyisocyanates alone or in conjunction with compounds containing at least two Zerewitinov-active hydrogen atoms, for example polycarbodiimides, polyisocyanurates, polyureas, polybiurets, polyamides, polyallophanates, polyurethanes and also mixed tapes or other polyisocyanate-based plastics. The process according to the present invention is particularly suitable for the production of foams containing polyurethane groups. Of these foams, molded foams produced in closed molds, preferably foams having an integral density distribution and an impervious outer skin, are particularly preferred.

Starting components suitable for use in accordance with the present invention include aliphatic, cycloaliphatic, araliphatic, aromatic and heterocyclic polyisocyanates of the type described, for example, by W. Siefken in Justus Liebigs Annalen der Chemie, 562, pages 75 to 136. Suitable examples include ethylene diisocyanate; 1,4-tetramethylene diisocyanate; 1,6-hexamethylene diisocyanate; 1,12-dodecane diisocyante; cyclobutane-1,3-diisocyanate; cyclohexane-1,3-and 1,4-diisocyanate and mixtures of these isomers; 1-isocyanato-3,3,5-trimethyl-5-isocyanatomethyl cyclohexane (German) Auslegeschrift No. 1,202,785); 2,4- and 2,6-hexahydrotolylene diisocyanate and mixtures of these isomers; hexahydro-1,3- and/or 1,4-phenylene diisocyanate; perhydro-2,4'- and/or 4,4'-diphenyl methane diisocyanate; 1,3- and 1,4-phenylene diisocyanate; 2,4- and 2,6-tolylene diisocyanate and mixtures of these isomers; diphenyl methane-2,4'- and/or -4,4'-diisocyanate; naphthylene-1,5-diisocyanate; triphenyl methane-4,4',4''-triisocyanaate; polyphenyl polymethylene polyisocyanates of the type which may be obtained by condensing aniline with formaldehyde, followed by phosgenation, and which are described, for example, in British Pat. Nos. 874,430 and 848,671; perchlorinated aryl polyisocyanates of the type described, for example, in German Auslegeschrift 1,157,601; polyisocyanates containing carbodiimide groups of the type described in German Pat. No. 1,092,007; diisocyanates of the type described in U.S. Pat. No. 3,492,330; polyisocyanates containing allophanate groups of the type described, for example, in British Pat. No. 994,890, Belgian Pat. No. 761,626 and published Dutch Patent Application No. 7,102,524; polyisocyanates containing isocyanurate groups of the type described, for example, in German Pat. Nos. 1,022,789, 1,222,067 and 1,027,394 and in German Offenlegungsschriften 1,929,034 and 2,004,048; polyisocyanates containing urethane groups of the type described, for example, in Belgian Pat. No. 752,261 or in U.S. Pat. No. 3,394,164; polyisocyanates containing acylated urea groups as described in German Pat. No. 1,230,778; polyisocyanates containing biuret groups of the type described, for example, in German Pat. No. 1,101,394, in British Pat. No. 889,050 and in French Pat. No. 7,017,514; polyisocyanates obtained by telomerisation reactions of the type described, for example, in Belgian Pat. No. 723,640; polyisocyanates containing ester groups of the type described, for example, in British Pat. Nos. 965,474 and 1,072,956, in U.S. Pat. No. 3,567,763 and in German Pat. No. 1,231,688; and, reaction products of the above-mentioned isocyanates with acetals as described in German Pat. No. 1,072,385.

It is also possible to use the isocyanate group containing distillation residues accumulating in the production of isocyanates on a commercial scale, optionally in solution in one or more of the aforementioned polyisocyanates. It is also possible to use mixtures of the aforementioned polyisocyanates.

In general, it is particularly preferred to use the readily available polyisocyanates, such as 2,4- and 2,6-tolylene diisocyanate, and mixtures of these isomers ("TDI"); polyphenyl polymethylene polyisocyanates of the type obtained by condensing aniline with formaldehyde, followed by phosgenation ("crude MDI"); and polyisocyanates containing carbodiimide groups, urethane groups, allophanate groups, isocyanurate groups, urea groups or biuret groups ("modified polyisocyanates").

Other starting components which may be used in accordance with the present invention are compounds containing at least two isocyanate-reactive hydrogen atoms and generally having a molecular weight of from 62 to 10,000. In addition to compounds containing amino groups, thiol groups or carboxyl groups, compounds of this type are preferably polyhydroxyl compounds, and more especially compounds containing from 2 to 8 hydroxyl groups, and especially those having molecular weights of from 800 to 10,000, more preferably of from 1000 to 6000. Examples of such polyhydroxyl compounds include for example polyesters, polyethers, polythioethers, polyacetals, polycarbonates and polyester amides containing at least 2, generally from 2 to 8, but preferably fom 2 to 4 hydroxyl groups, of the type commonly used for the production of homogeneous and cellular polyurethanes.

Examples of suitable polyesters containing hydroxyl groups are reaction products of polyhydric, preferably dihydric, and, optionally, trihydric alcohols with polybasic, preferably dibasic, carboxylic acids. Instead of the free polycarboxylic acids, the corresponding polycarboxylic acid anhydrides or corresponding polycarboxylic acid esters of lower alcohols or mixtures thereof may also be used for the production of the polyesters. The polycarboxylic acids may be aliphatic, cycloaliphatic, aromatic and/or heterocyclic, and may optionally be substituted, for example by halogen atoms, and/or may be unsaturated. Examples of these polycarboxylic acids include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride, fumaric acid, dimeric and trimeric fatty acids, such as oleic acid, optionally in admixtures with monomeric fatty acids, terephthalic acid dimethyl ester and terephthalic acid-bis-glycol ester. Examples of suitable polyhydric alcohols include: ethylene glycol, 1,2- and 1,3-propylene glycol, 1,4- and 2,3-butylene glycol, 1,6-hexane diol, 1,8-octane diol, neopentyl glycol, cyclohexane dimethanol (1,4-bis-hydroxymethyl cyclohexane), 2-methyl-1,3-propane diol, glycerol, trimethylol propane, 1,2,6-hexane triol, 1,2,4-butane triol, trimethylol ethane, pentaerythritol, quinitol, mannitol and sorbitol, methyl glycoside, also diethylene glycol, triethylene glycol, tetraethylene glycol, polyethylene glycols, dipropylene glycol, polypropylene glycols, dibutylene glycol and polybutylene glycols. The polyesters may contain terminal carboxyl groups. Polyesters of lactones, for example $\epsilon$-caprolactone, or hydroxy carboxylic acids, for example $\omega$-hydroxy caproic acid, may also be used. The above-mentioned low molecular weight polyhydric alcohols may also be used as such.

The polyethers containing at least two, generally from two to eight, preferably two or three hydroxyl groups suitable for use in accordance with the present invention are also known and may be obtained, for example, by the polymerisation of epoxides, such as ethylene oxide, propylene oxide, butylene oxide, tetrahydrofuran, styrene oxide or epichlorhydrin on their own, for example in the presence of $BF_3$, or by the chemical addition of these epoxides, optionally in admixture or in succession, to starter components containing reactive hydrogen atoms, such as water, alcohols or amines. Specific examples which ethylene glycol, 1,3- or 1,2-propylene glycol, trimethylol propane, 4,4'-dihydroxy diphenyl propane, aniline, ammonia, ethanolamine, ethylene diamine, and the like. Sucrose polyethers of the type described, for example, in German Auslegeschriften 1,176,358 and 1,063,938 may also be used for the purposes of the present invention. In many cases, it is preferred to use polyethers of the type which contain predominant amounts of primary OH-groups (up to 90%, by weight, based on all the OH-groups present in the polyether). Polyethers modified by vinyl polymers of the type obtained, for example, by the polymerisation of styrene and acrylonitrile in the presence of polyethers (U.S. Pat. Nos. 3,383,351; 3,304,273; 3,523,093 and 3,110,695; German Pat. No. 1,152,536) are also suitable, as are polybutadienes containing OH-groups.

Among the polythioethers, reference is made in particular to the condensation products of thiodiglycol with itself and/or with other glycols, dicarboxylic acids, formaldehyde, aminocarboxylic acids or amino alcohols. Depending upon the co-components, these products are polythio mixed ethers, polythioether esters or polythioether ester amides.

Suitable polyacetals include, for example, those compounds which may be obtained by the reaction of glycols, such as diethylene glycol, triethylene glycol, 4,4'-dioxethoxy diphenyl dimethyl methane and hexane diol, with formaldehyde.

Polyacetals suitable for the purposes of the present invention may also be obtained by polymerising cyclic acetals.

Suitable polycarbonates containing hydroxyl groups include those known compounds which may be obtained, for example, by reacting diols, such as 1,3-propane diol, 1,4-butane diol and/or 1,6-hexane diol, diethylene glycol, triethylene glycol and tetraethylene glycol, with diaryl carbonates, for example diphenyl carbonate, or with phosgene.

Examples of the polyester amides and polyamides include the predominantly linear condensates obtained from polybasic saturated and unsaturated carboxylic acids or the anhydrides thereof and polyhydric saturated and unsaturated amino alcohols, diamines, polyamines and mixtures thereof.

Polyhydroxyl compounds already containing urethane or urea groups and optionally modified natural polyols, such as castor oil, carbohydrates, starch, may also be used. Addition products of alkylene oxides with phenol-formaldehyde resins or even with urea-formaldehyde resins may also be used in accordance with the present invention.

Representatives of the compounds useable in accordance with the present invention are generally known and are described, for example, in High Polymers, Vol. XVI, "Polyurethanes, Chemistry and Technology", by Saunders-Frisch, Interscience Publishers, New York, London, Vol. I. 1962, pages 32 to 42 and pages 44 to 54, and Vol. II, 1964, pages 5-6 and 198-199, and in Kunststoff-Handbuch, Vol. VII, Vieweg-Hochtlen, Carl-Hanser-Verlag, Munich, 1966, pages 45 to 71.

If the process according to the present invention is used for the production of molded plastics, especially molded foams, no more than 10% of whose surface is covered by a metal sheet or metal foil, so that the reaction mixture comes into direct contact with the mold dividing wall during foaming, the conventional mold release agents may be used in the process according to the present invention. Suitable mold release agents are the known internal mold release agents of the type recommended for the production of molded foams and described, for example, in German Offenlegungsschriften No. 1,953,637; 2,121,670 and 2,356,692. It is, of course, also possible to use "self-releasing" polyisocyanates modified with corresponding additives, of the type described in German Offenlegungsschrift No. 2,307,589. Alternatively, the release agents described in German Offenlegungsschriften No. 2,319,648; 2,356,692; 2,363,452; 2,404,310 and 2,431,968 may be used. Known external release agents, i.e. release agents applied to the inner wall of the mold, may, of course, also be used.

According to the present invention, water and/or readily volatile organic substances may be used as blowing agents. Suitable organic blowing agents include, for example, acetone; ethyl acetate; halogen-substituted alkanes, such as methylene chloride, chloroform, ethylidene chloride, vinylidene chloride, monofluorotrichloromethane, chlorodifluoromethane, dichlorodifluoromethane and trichlorotrifluoroethane; butane; hexane; heptane; diethyl ether, and the like. A blowing effect may also be obtained by adding compounds which decompose at temperatures above room temperature giving off gases such as nitrogen. Examples of such compounds include azo compounds, such as azoisobutyronitrile. Other examples of blowing agents and information on the use of blowing agents may be found in Kunststoff-Handbuch, Vol. VII, by Vieweg and Hochtlen, Carl-Hanser-Verlag, Munich 1966, pages 108 and 109, 453 to 455 and 507 to 510.

According to the present invention, catalysts are also frequently used. Examples of suitable known catalysts include, for example tertiary amines, such as triethylamine, tributyl amine, N-methyl morpholine, N-ethyl morpholine, N-cocomorpholine, N,N,N',N'-tetramethyl ethylene diamine, 1,4-diazabicyclo-(2,2,2)-octane, N-methyl-N'-dimethyl aminoethyl piperazine, N,N-dimethyl benzylamine, bis-(N,N-diethylaminoethyl)-adipate, N,N-diethyl benzylamine, pentamethyl diethylene triamine, N,N,-dimethyl cyclohexylamine, N,N,N',N'-tetramethyl-1,3-butane diamine, N,N-dimethyl-β-phenyl ethylamine, 1,2-dimethyl imidazole, 2-methyl imidazole and tetramethyl guanidine.

Examples of tertiary amines containing isocyanate-reactive hydrogen atoms are triethanolamine, triisopropanolamine, N-methyl diethanolamine, N-ethyl diethanolamine and N,N-dimethyl ethanolamine, and reaction products thereof with alkylene oxides, such as propylene oxide and/or ethylene oxide.

Other suitable catalysts include silaamines having carbon-silicon bonds of the type described, for example, in German Pat. No. 1,229,290. Examples include 2,2,4-trimethyl-2-silamorpholine and 1,3-diethyl aminomethyl tetramethyl disiloxane.

Other suitable catalysts include nitrogen-containing bases, such as tetraalkyl ammonium hydroxides, alkali metal hydroxides such as sodium hydroxide, alkali metal phenolates, such as sodium phenolate, and alkali metal alcoholates, such as sodium methylate. Hexahydrotriazines may also be used as catalysts.

According to the present invention, organometallic compounds, especially organo tin compounds, may also be used as catalysts, as may alkali metal acetates.

Preferred organo tin compounds are tin (II) salts of carboxylic acids, such as tin (II) acetate, tin (II) octoate, tin (II) ethyl hexoate and tin (II) laurate, and the dialkyl tin salts of carboxylic acids, such as dibutyl tin diacetate, dibutyl tin dilaurate, dibutyl tin maleate or dioctyl tin diacetate.

Further representatives of catalysts suitable for use in accordance with the present invention and details on the way in which the catalysts work may be found in Kunststoff-Handbuch, Vol. VII, by Vieweg and Hochtlen, Carl-Hanser-Verlag, Munich, 1966, for example on pages 96 to 102.

The catalysts are generally used in a quantity of from about 0.001 to 10%, by weight, based on the quantity of compounds containing at least two isocyanate-reactive hydrogen atoms and having a molecular weight of from 62 to 10,000.

According to the present invention, surface-active additives, such as emulsifiers and foam stabilizers, may also be used. Examples of emulsifiers include the sodium salts of castor oil sulphonates or of fatty acids or salts of fatty acids with amines, such as diethylamine/oleic acid or diethanolamine/stearic acid. Alkali metal or ammonium salts of sulphonic acids, such as those of dodecyl benzene sulphonic acid of dinaphthyl methane disulphonic acid, or of fatty acids, such as ricinoleic acid, or of polymeric fatty acids, may also be used as surface-active additives.

Suitable foam stabilizers are preferably water-soluble polyether siloxanes. These compounds are generally of such structure that a copolymer of ethylene oxide and propylene oxide is attached to a polydimethyl siloxane radical. Foam stabilizers of this type are known and are described, for example, in U.S. Pat. No. 2,764,565.

According to the present invention, it is also possible to use reaction retarders, for example substances which are acid in reaction, such as hydrochloric acid, sulphuric acid, phosphoric acid or organic acid halides; cell regulators, such as paraffins or fatty alcohols or dimethyl polysiloxanes; pigments or dyes; flameproofing agents, such as for example tris-chlorethyl phosphate or ammonium phosphate and polyphosphate; stabilizers against the effects of ageing and weather; plasticizers; substances having fungistatic and bacteriostatic effects; and fillers, such as barium sulphate, kieselguhr, carbon black or prepared chalk.

Other examples of useful surface-active additives, foam stabilizers, cell regulators, reaction retarders, stabilizers, flameproofing substances, plasticizers, dyes, fillers and substances having fungistatic and bacteriostatic effects, and also details on the way in which these additives are to be used and how they work, may be found in Kunststoff-Handbuch, Vol. VII, published by Vieweg and Hochtlen, Carl-Hanser-Verlag, Munich, 1966, pages 103 to 113.

Foaming is preferably carried out in molds. To this end, the reaction mixture is introduced into a mold. Suitable mold materials are metals, for example aluminum, or plastics, for example epoxide resins. Inside the mold the foamable reaction mixture foams and forms the molding. In-mold foaming may be carried out in such a way that the molding has a cellular structure at its surface, or even in such a way that the molding has a compact skin and a cellular core. According to the present invention, it is possible in this connection to introduce such a quantity of foamable reaction mixture into the mold that the foam formed just fills the mold. However, it is also possible to introduce into the mold more foamable reaction mixture than is required for filling the mold with foam. This technique is known as "overcharging" and is known, for example, from U.S. Pat. Nos. 1,178,490 and 3,182,104.

According to the present invention, cold-hardening foams may also be produced (cf. British Pat. No. 1,162,517, German Offenlegungsschrift 2,153,086).

Suitable reinforcing metals which are either prefoamed with polyurethane foams (on one or more sides) or are introduced into the mold in such a way that they are completely or partly surrounded by the foam, are any of the metals normally used for reinforcing purposes, such as iron, steel, aluminum, copper, zinc and the various alloys thereof of the type commonly used for sandwich structures and reinforcing purposes. The process according to the present invention is particularly suitable for the production of foams surrounded by metal sheet or metal foil, for which purpose the inner wall of the mold is lined, before filling, with a metal foil or metal sheet.

The process according to the present invention may be carried out using substantially any aqueous polyurethane dispersions, i.e. non-ionic, cationic or anionic polyurethane dispersions. It is possible to use both emulsifier-containing and also emulsifier-free polyurethanes, i.e. polyurethanes containing incorporated anionic, cationic or non-ionic/hydrophilic centers, in the form of aqueous dispersions thereof. The process according to the present invention is preferably carried out using emulsifier-free polyurethane dispersions, more especially using emulsifier-free anionic or cationic aqueous polyurethane dispersions and, with particular preference, using emulsifier-free anionic aqueous polyurethane dispersions.

In the context of the present invention, "anionic dispersions" are dispersions in which the dispersed polyurethane contains incorporated ionic centers, more especially sulphonate or carboxylate groups. Accordingly, cationic dispersions are dispersions in which the dispersed polyurethane contains incorporated cationic centers, especially ammonium groups. Suitable non-ionic dispersions are known and are described, for example in German Offenlegungsschriften 2,314,512; 2,314,513 and 2,320,719; suitable cationic dispersions are known and are described in German Auslegeschrift No. 1,178,586; German Pat. Nos. 1,184,946 and 1,495,693 or U.S. Pat. No. 3,479,310; suitable anionic dispersions are known and are described in U.S. Pat. Nos. 3,479,310 and 3,756,992; British Pat. No. 1,076,688 and German Offenlegungsschrift No. 2,446,440. As mentioned above, polyurethane dispersions suitable for the process according to the present invention include any polyurethane dispersions irrespective of the structure of the dispersed polyurethane. The dispersions may also contain solvents, for example a residue of the acetone often used in the production thereof. Other publications concerned with the properties and production of suitable aqueous polyurethane dispersions are: deutsche Farbenzeitung 21, (1967), 368; Farbe und Lack 73 (1967), 448; Angewandte Chemie 82 (1970), 53; I. Oil Col. Chem. Assoc. 53 (1970) 363; J. app. Polymer Sci. 9 (1965); Kunststoffe 57 (1967) 337; Kautschuk und Gummi, Kunststoffe 24 (1971) 641; and Angewandte Makromolekulare Chemie 26 (1972) 85.

With the dispersions used, the metal/polyurethane bond is formed by anchorage of the ionic and hydrophilic groups to the metal and also by the high compatibility of these dispersions with the polyurethane molding.

Other adhesion promoters preferably used in combination with the aqueous polyurethane dispersions according to the present invention are, preferably, alkoxy silanes corresponding to the following general formula:

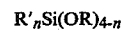

wherein
R' preferably represents an aliphatic hydrocarbon radical having from 1 to 6 carbon atoms or a mixed aliphatic-aromatic hydrocarbon radical having from 7 to 12 carbon atoms which is preferably substituted or interrupted by reactive groups, more especially by isocyanate-reactive groups;
R represents an aliphatic hydrocarbon radical having from 1 to 4 carbon atoms, preferably a methyl group; and
n represents 0 or an integer of from 1 to 3, preferably 0 or 1, and most preferably 1.

The suitability of the silanes for the process according to the present invention is not dependent upon the nature of the radicals R' and R.

Although radicals R' as defined above, especially those which contain isocyanate-reactive groups, are preferred, it is possible to use silanes in which R' represents an unsubstituted hydrocarbon radical, i.e. not only an alkyl radical, but also, for example, a cycloalkyl radical. Silanes containing olefinically unsaturated radicals R' or substituents R' substituted by inert substituents (for example halogen atoms) are also suitable.

In the above context, "isocyanate-reactive groups" include amino, hydroxy or mercapto groups which are the preferred "isocyanate reactive groups".

The following are specific examples of suitable silanes:

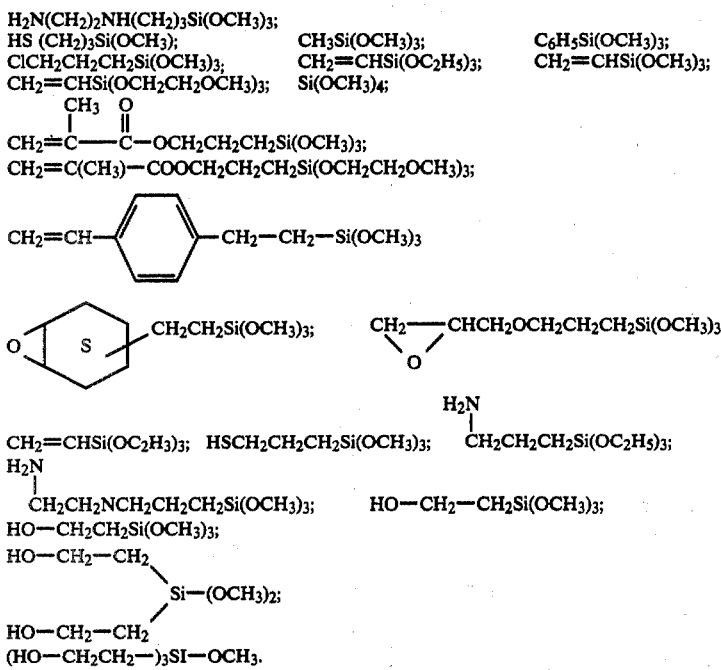

Such compounds are generally commercially available and are generally described by E. P. Plueddemann in Journal of Paint Technology, November 1970, "Mechanism of adhesion of coatings through reactive silanes".

In cases where silanes containing amino groups are used, they may also be employed in the form of the salts thereof with acids, such as hydrochloric acid.

To carry out the process according to the present invention, the surface of the metal part, i.e. in particular the metal sheet or metal foil, is coated with an aqueous polyurethane dispersion by any of the known coating techniques of the type commonly used for lacquering, for example, dip coating, spray-coating, brush-coating, swab-coating or coating.

In order to obtain optimum adhesion values, the metal parts coated with the polyurethane dispersion have to be dried before processing. To this end, the metal parts may either be heated for from 10 to 20 minutes at 100° C. or, alternatively, the coated metals may be stored, for example, for 12 hours at room temperature.

In carrying out the process according to the present invention, the quantity in which the polyurethane dispersion is used is generally measured in such a way that, after the dispersion has dried, a polyurethane film from 5 to 100 μm thick is left on the foam-side metal surface.

Particularly favorable results are obtained in cases where mixtures of polyurethane dispersions with the exemplified alkoxy silanes are used. For applying mixtures such as these, the components are either mixed shortly before use in suitable mixing units (multicomponent spray guns), or, alternatively, the polyurethane dispersion is premixed with silane and the resulting mixture applied.

The ratio in which the polyurethane dispersions are mixed with the silane is governed by the concentration of the products used and, for a 30% by weight aqueous polyurethane dispersion and an undiluted silane compound, should be in the range (by weight) of from 100:20 to 100:0.01, preferably from 100:5 to 100:0.5. If more concentrated or more diluted polyurethane dispersions are used (the concentration of the dispersions is not critical and may vary within wide limits such as 10 to 70% by weight of solids) a correspondingly higher or lower amount of silane based on the weight of the dispersions should be used so that the weight ratio of dispersed polyurethane to silane corresponds to the figures indicated for a 30% dispersion. The silane compounds may, of course, also be used in the form of solutions in inert solvents.

The process according to the present invention is particularly suitable for the production of molded plastics, especially molded foams, which are surrounded by a metal foil or metal sheet. To this end, the inner surface of the mold used is at least partly lined, before filling with a metal sheet or metal foil pretreated in accordance with the present invention on the plastics side. The process according to the present invention is also eminently suitable for the production of foamclad hollow metal profiles, containers or tubes. To this end, the surface of the profile, container or tube to be coated is initially pretreated with the adhesion promoter in accordance with the present invention and, after the adhesion promoter has dried, the plastics-forming reaction is carried out on the pretreated surface. For example, a reaction mixture which reacts to form the foam is sprayed onto the pretreated metal surface. However, it is also possible, for example, for a metal vessel to be clad with foam to form the inner cavity of a mold whose walls limit the volume of foam formed during the foam-forming reaction. The process according to the present invention is also suitable, for example for the production of sheet-form plastics/metal composites.

The process according to the present invention is particularly suitable for the production of molded plastics, especially molded forms, which are surrounded by a metal foil or metal sheet. To this end, the inner surface of the mold used is at least partly lined, before filling with a metal sheet or metal foil pretreated in accordance with the present invention on the plastics side. The process according to the present invention is also eminently suitable for the production of foamclad hollow metal profiles, containers or tubes. To this end, the surface of the profile, container or tube to be coated with foam is initially pretreated with the adhesion promoter in accordance with the present invention and, after the adhesion promoter has dried, the plastics-forming reaction is carried out on the pretreated surface. For example, a reaction mixture which reacts to form the foam is sprayed onto the pretreated metal surface. However, it is also possible, for example, for a metal vessel to be clad with foam to form the inner cavity of a mold whose walls limit the volume of foam formed during the foam-forming reaction. The process according to the present invention is also suitable, for example for

EXAMPLE 1

(Comparison Example without the use of an adhesion promoter)

An aluminum sheet (dimensions: 300×100×0.3 mm) is introduced into a metal mold (molding dimensions: 300×200×10 8 mm) tempered to 60° C. which is then filled with a liquid reactive polyurethane mixture. The polyurethane mixture consists of 100 parts of a polyol mixture having an OH-number of 480 consisting of:

75 parts, by weight, of a polyether having an OH-number of 630 obtained by the addition of propylene oxide with ethylene diamine, and 25 parts, by weight, of a polyether having an OH-number of 28 obtained by the addition of propylene oxide and ethylene oxide with propylene glycol, which is mixed with 1 part, by weight, of a standard commercial-grade polysiloxane stabilizer which is believed to be a polysiloxane-polyalkylene-oxide block-copolymer, 0.1 part, by weight of diethyl triamine and 125 parts by weight of a polyisocyanate which has been obtained by phosgenating aniline-formaldehyde condensates and which has a viscosity at 25° C. of 320 cP and an NCO-content of 31.5%, by weight. The reactive polyurethane mixture is introduced into the mold where it foams and hardens into a molding. After 6 minutes, the molding is removed from the mold. This molding has a compact skin on all sides and a cellular core. The metal foil is prefoamed on one side. Test specimens (measuring 20×300×10 mm) ae cut out of the molding and the metal foil detached by a dynamometer. The maximum separation forces amount to 1 Newton. Because of the tension inherent in it, part of the metal foil detaches itself spontaneously from the polyurethane molding.

EXAMPLE 2

(Use of an anionic polyurethane dispersion)

The anionic polyurethane dispersion used in the following Example was prepared as follows:

209 g of a polyester based on adipic acid, hexamethylene glycol and neopentyl glycol having an average molecular weight of 1700 are melted and the water removed by stirring in vacuo at a temperature of 120° C. for 30 minutes. After cooling to 70° C., 38 g of hexamethylene diisocyanate are added, after which the mixture is gradually heated, with stirring, to 120° C. The temperature of 120° C. is maintained while stirring for 2 hours. After cooling to 70° C., 700 ml of acetone are added. The temperature is adjusted to 55° C. 13.75 g of a 43% aqueous solution of the sodium salt of N-(2-aminoethyl)-2-aminoethane sulphonic acid, 1.90 g of ethylene diamine and 58 g of water are then added to the acetone solution. The thus-obtained mixture is stirred for 5 minutes at 55° C. 270 ml of water are then stirred in. The acetone is then removed in vacuo, leaving an aqueous polyurethane dispersion having a solids content of approximately 40%, by weight. The dispersed polyurethane has a sulphonate group content of 0.96%, by weight.

The procedure is then as in Example 1, except that the aluminum sheet introduced is sprayed beforehand with the polyurethane dispersion described above and dried for 12 hours at room temperature. The thus-obtained polyurethane film has a layer thickness of 50 $\mu$m. Thereafter the procedure is as described in Example 1.

The bond strength of the aluminum foil to the polyurethane molding is equivalent to 20 Newtons.

After test specimens have been boiled in water for 3 hours at 100° C., the separation force also mounts to 20 Newtons.

EXAMPLE 3

(Use of an anionic polyurethane dispersion in combination with an alkoxy silane)

The procedure is as in Example 1, except that the aluminum sheet which is to be bonded to the polyurethane molding is sprayed before prefoaming with a mixture of the above-mentioned aqueous polyurethane dispersion and a methoxy silane corresponding to the formula: $(CH_3O)_3Si(CH_2)_3NHCH_2CH_2NH$, ratio, by weight, of PUR dispersions: silane = 100:1. The aluminum sheet is then dried for 12 hours at room temperature. The polyurethane film has a thickness of 50 $\mu$m. The thus-coated aluminum sheet is then prefoamed with polyurethane in the same way as in Example 1. After the test specimens have been up, a maximum separation force of more than 100 Newton is measured.

After the test specimens have been subjected to the boiling test (3 hours at 100° C. in water), the maximum separation force is still more than 100 N.

EXAMPLE 4

(Use of a cationic polyurethane dispersion)

The cationic polyurethane dispersion used in the following Example was prepared as follows:

1000 g (568 m Mole) of a polyester produced from phthalic acid, adipic acid and ethylene glycol in a molar ratio of 1:1:2.3, 40 g (336 m Mole) of N-methyl diethanolamine and 56 g (930 m Mole) or urea are stirred at 80° C. with 228 g (1.356 mole) of 1,6-diisocyanatohexane (HDI). An exothermic reaction takes place, resulting at about 135° C. in melting and subsequent reaction of the urea (temperature peak approximately 145° C.). After about 30 minutes at from 130° to 140° C., the NCO-band at 2250 cm$^{-1}$ has disappeared from the IR-spectrum of the melt. Following the addition of 16 g (161 m Mole) of chloracetamide, the mixture is stirred for 30 minutes at 130° C. (quarternization), after which a solution of 14 g (2320 mole) of glacial acetic acid in 240 cc of water is stirred in. 160 cc (1.7 mole) of a 30% aqueous formaldehyde solution are then added over a period of 5 minutes, after which the opaque cloudy solution is stirred for 30 minutes at 90° C. (methylolation). 1000 ml of water are then stirred in over a period of 20 minutes at from 90° to 95° C. (phase reversal at 820 ml). The latex formed is adjusted to pH 4 by the addition of 50 ml of 30% tartaric acid followed by stirring for 1 hour at 110° C. (polycondensation). 2.8 kg of a 48% polyurethane dispersion are obtained.

The procedure is then as in Example 1, except that the aluminum sheet introduced is sprayed beforehand with the polyurethane dispersion described above and dried for 12 hours at room temperature. The thus-obtained polyurethane film has a layer thickness of approximately 30 μm. Thereafter, the procedure is as described in Example 1. The bond strength of the aluminum foil to the polyurethane molding is equivalent to 18 Newtons.

After the boiling test (3 hours at 100° C.), a separation force of 15 Newtons is measured.

EXAMPLE 5

(Use of a cationic polyurethane dispersion in combination with an alkoxy silane)

The procedure is as described in Example 1, except that the aluminum sheet which is to be bonded to the polyurethane molding is sprayed, before prefoaming with a mixture of the aqueous polyurethane dispersion described in Example 4, with a methoxy silane corresponding to the formula: $(CH_3O)_3Si(CH_2)_3NHCH_2CH_2NH_2$, ratio, by weight, of the polyurethane dispersion: silane = 100:1. The aluminum sheet is then dried for 12 hours at room temperature. The polyurethane film has a thickness of approximately 50 μm. The thus-coated aluminum sheet is then prefoamed with polyurethane in the same way as in Example 1. After the test specimens have been produced, a maximum separation force of more than 80 Newtons is measured.

After the boiling test (3 hours at 100° C. in water), the test specimens still show the maximum separation force of 80 Newtons.

EXAMPLE 6

(Use of a non-ionic polyurethane dispersion)

The non-ionic polyurethane dispersion used in the following Example was prepared as follows:

Allophanate diisocyanate A:

1500 g of n-butanol-started polyethylene oxide monohydric alcohol having a molecular weight of 2030 are heated to 100° C. for 5 hours with 1305 g of tolylene diisocyanate in the presence of 0.1% of p-toluene sulphonic acid methyl ester and 0.005% of zinc acetyl acetonate. After the addition of 0.025% of benzoyl chloride, 2805 g of a solution of an allophanate diisocyanate to be used in accordance with the present invention in tolylene diisocyanate (80% 2,4- and 20% 2,6-isomer = TDI 80) are obtained. The NCO-value amounts to 20% and the polyethylene oxide content to approximately 53%.

Non-ionic polyurethane dispersion:

200 g of a polyester of adipic acid/ethylene glycol having a molecular weight of 2000 are dehydrated in vacuo at a temperature of 110° C. for about 30 minutes. After cooling to 70° C., 57.2 g of allophanate diisocyanate A and added, followed by heating (for about 1 hour) at 100° C. until the NCO-value reaches or is just short of the calculated NCO-value of 2.29%. This prepolymer is dissolved in 800 ml of acetone. An extender solution, consisting of 0.6 g of ethylene diamine, 1.6 g of hydrazine hydrate and 30 ml of water, is then added to the acetone solution at a temperature of 50° C. This reaction mixture is left reacting for 5 minutes at 50° C. A distinct increase in viscosity is observed. On completion of the reaction, 360 ml of water are stirred in and the acetone distilled off under reduced pressure. A thinly liquid dispersion is obtained, being characterized by the indexes NCO/OH = 1.7, NCO/NH = 1.67 and an ethylene oxide content of 9.3%. The dispersion has a solids content of 40%.

The procedure is then as described in Example 1, except that, instead of the aluminum sheet, a steel sheet (VA-steel) is introduced into the mold, sprayed with the non-ionic polyurethane dispersion described above and dried for 12 hours at room temperature. The thus-obtained polyurethane film has a layer thickness of approximately 50 μm. Thereafter, the procedure is as in Example 1.

The bond strength of the steel foil to the polyurethane molding is equivalent to 40 Newtons. After the boiling test (3 hours at 100° C.), the bond strength still amounts to 40 Newtons.

EXAMPLE 7

(use of a non-ionic polyurethane dispersion in combination with an alkoxy silane)

The procedure is as in Example 1, except that the aluminum sheet which is to be bonded to the polyurethane molding is sprayed before prefoaming with a mixture of the aqueous polyurethane dispersion described in Example 6 with a methoxy silane corresponding to the formula:

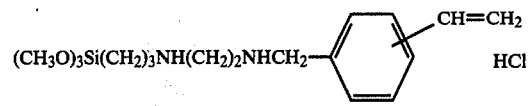

ratio, by weight, of PUR dispersion: silane = 100:1. The aluminum sheet is then dried for 12 hours at room temperature. The polyurethane film has a thickness of 50 μm. The thuscoated aluminum sheet is then prefoamed with polyurethane in the same way as in Example 1. After the test specimens have been produced, a maximum separation force of more than 100 Newtons is measured.

After the boiling test (3 hours at 100° C. in water), the test specimens still show the maximum separation force of 90 Newtons.

EXAMPLE 8

An aluminum sheet (dimensions: 300×100×0.3 mm) is introduced into a metal mold (molding dimensions: 300×200×10 mm) tempered to 75° C. The mold is then filled with a liquid reactive polyurethane mixture.

The polyurethane mixture consists of 100 parts, by weight, of a polyether which has been obtained by the addition of 83% of propylene oxide and 17% of ethylene oxide with trimethylol propane and which has an OH-number of 36: 0.6 part, by weight, of potassium acetate, dissolved in 1.7 parts, by weight, of diethylene glycol, and 250 parts, by weight, of a urethane-group-containing polyisocyanate which has been obtained by modifying a phosgenation product of an aniline/formaldehyde condensate having a diisocyanatodiphenyl methane content of approximately 79%, by weight, with 3%, by weight, of tripropylene glycol, based on the polyisocyanate mixture to be modified. Viscosity of the modified polyisocyanate mixture of 25° C.: 90 mPas, NCO-content = 28%.

15 seconds after the mold has been filled with the non-foamable reaction mixture, which completely fills the mold cavity, the solid polyurethane/polyisocyanurate molding (gross density without metal 1.2 g/m$^3$) is removed from the mold. The metal foil is bonded to the plastic on one side. Test specimens (measuring 20×300×10 mm) are cut out of the molding and the metal foil detached by a dynamometer. The maximum separation forces amount to less than 1 Newton.

EXAMPLE 9

The procedure is an described in Example 8, except that the aluminum sheet introduced into the mold is sprayed beforehand with an aqueous dispersion of the type described in Example 2 and dried for 12 hours at room temperature. After the solid polyurethane/polyisocyanurate test specimens bonded on one side to the aluminum foil have been produced, the maximum adhesion force required to detach the metal foil is measured by means of a dynamometer. This force amounts to 90 Newtons. After the boiling test (3 hours at 100° C.), a separation force of 90 Newtons is measured.

EXAMPLE 10

The procedure is as in Example 8, except that the aluminum sheet introduced into the mold is sprayed beforehand with a mixture of the aqueous polyurethane dispersion and the methoxy silane described in Example 3 and dried for 12 hours at room temperature. After the solid polyurethane test specimens bonded on one side to the aluminum foil have been produced, the force required to detach the metal foil is measured by means of a dynamometer. This force amounts to 140 Newtons.

After the boiling test (3 hours at 100° C.), a separation force of 140 Newtons is measured.

What is claimed is:

1. In a process for producing composite materials comprising applying an adhesion promoter to a metal surface, allowing said adhesion promoter to dry, applying a polyisocyanate reaction mixture to the thus treated metal surface and allowing said reaction mixture to fully react, the improvement wherein said adhesion promoter comprises an aqueous polyurethane dispersion.

2. The process of claim 1, wherein said aqueous polyurethane dispersions are non-ionic, cationic, or anionic having hydrophilic centers.

3. A process as claimed in claim 1, wherein the dispersion is an aqueous polyurethane dispersion selected from the group consisting of emulsifier-free anionic and cationic aqueous polyurethane dispersions.

4. A process as claimed in claim 1, wherein the metal coated with the polyurethane dispersion is dried by heating from 10 to 20 minutes at 100° C.

5. A process as claimed in claim 1, wherein the metal coated with the polyurethane dispersion is dried by storing at room temperature for 12 hours.

6. A process as claimed in claim 1, wherein the aqueous polyurethane dispersion film is from 5 to 100 μm thick after drying.

7. A process as claimed in claim 1, wherein a reaction mixture which reacts to form a polyurethane foam is used as said polyisocyanate reaction mixture reacting to form a plastic.

8. The process of claim 1, wherein the metals are coated with an aqueous polyurethane dispersion which additionally contains an alkoxy silane.

9. The process of claim 8, wherein said alkoxy silane is the formula R'$_n$Si(OR)$_{4-n}$ wherein R' represents an aliphatic hydrocarbon radical having from 1 to 6 carbon atoms or a mixed aliphatic-aromatic - aromatic hydrocarbon radical having from 7 to 12 carbon atoms.

R represents an aliphatic hydrocarbon radical having from 1 to 4 carbon atoms, and n represents zero or an integer of from 1 to 3.

10. The process of claim 8, wherein

R' represents an aliphatic hydrocarbon radical having from 1 to 6 carbon atoms or a mixed aliphatic-aromatic hydrocarbon radical having from 7 to 12 carbon atoms, which radicals are submitted or interrupted by isocyanate reactive groups.

11. The process of claim 8, wherein

R represents a methyl group, and n represents the integer 1.

12. A process of claim 8, wherein said alkoxy silane is selected from the group consisting of

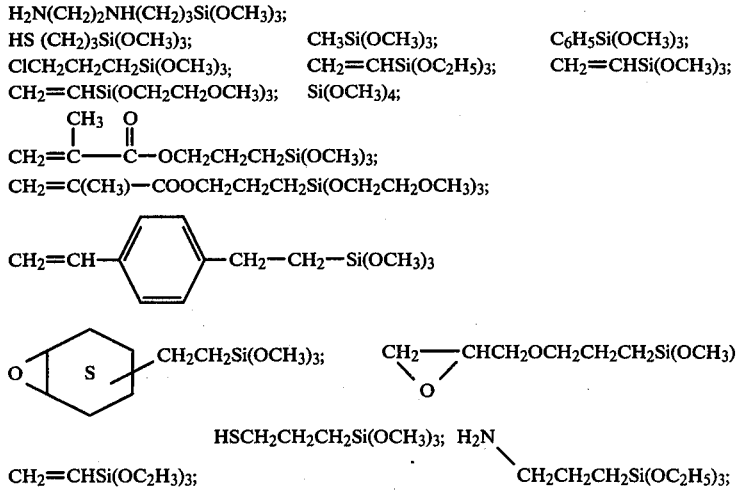

-continued
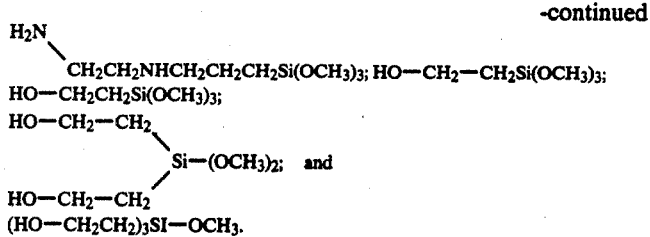
13. The process of claim 8, wherein the weight ratio of polyurethane dispersion to alkoxy silane is from 100:20 to 100:0.01.
14. The process of claim 8, wherein the alkoxy silanes are in the form of solutions in inert solvents when added to the aqueous polyurethane dispersion.
* * * * *